United States Patent
Li et al.

(10) Patent No.: US 9,473,974 B2
(45) Date of Patent: Oct. 18, 2016

(54) ENHANCING AQM TO COMBAT WIRELESS LOSSES

(71) Applicant: The University of Hong Kong, Hong Kong (CN)

(72) Inventors: Victor O. K. Li, Hong Kong (CN); Chengdi Lai, Hong Kong (CN); Ka-Cheong Leung, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 54 days.

(21) Appl. No.: 13/904,859

(22) Filed: May 29, 2013

(65) Prior Publication Data
US 2013/0322247 A1    Dec. 5, 2013

Related U.S. Application Data

(60) Provisional application No. 61/653,143, filed on May 30, 2012.

(51) Int. Cl.
*H04L 12/50* (2006.01)
*H04W 28/02* (2009.01)
(Continued)

(52) U.S. Cl.
CPC .......... *H04W 28/0242* (2013.01); *H04L 47/30* (2013.01); *H04L 47/32* (2013.01); *H04W 28/02* (2013.01)

(58) Field of Classification Search
CPC ... H04L 47/10; H04L 14/193; H04L 14/263; H04L 14/12; H04L 14/30; H04L 69/16; H04L 43/0829; H04L 43/0882; H04L 43/0894; H04L 47/12; H04L 47/30; H04L 47/11; H04L 47/127; H04L 43/08; H04L 49/90; H04W 80/06; H04W 28/04; H04W 28/0242; H04W 28/02; H04W 28/10; H04W 28/0289; H04N 19/00242
USPC ............... 370/230, 235, 232, 231, 412, 429; 348/14.02, 425.2, 466; 375/240.75
See application file for complete search history.

(56) References Cited

U.S. PATENT DOCUMENTS 7,085,236 B2    8/2006   Oldak et al.
7,286,485 B1 *  10/2007  Ouellette et al. ............. 370/252
(Continued)

FOREIGN PATENT DOCUMENTS

WO    WO/00/60817    10/2000
WO    WO/2006/047092    5/2006
(Continued)

OTHER PUBLICATIONS

Zheng et al., "An H∞ approach to congestion control design for AQM routers supporting TCP flows in wireless access networks," Computer Networks, 51 (2007), pp. 1684-1704.*
(Continued)

*Primary Examiner* — Marsha D Banks Harold
*Assistant Examiner* — Elton Williams
(74) *Attorney, Agent, or Firm* — Leason Ellis LLP

(57) ABSTRACT

In order to maintain a small, stable backlog at an internet router buffer, active queue management (AQM) algorithms drop packets probabilistically at the onset of congestion. This causes Transmission Control Protocol (TCP) data flow rates to reduce. However, wireless losses may be misinterpreted as congestive losses and induce spurious reductions in flow rates. A prior art AQM with random early detection (RED), fails to maintain a stable backlog under time-varying wireless losses. However, the present invention can resolve the problem and provide a robust tracking of the backlog to a preset reference level by applying a control-theoretic vehicle, Internal Model principle, to realize such tracking. An integral controller (IC) is used as an embodiment of the principle that is robust against time-varying wireless losses under various network scenarios.

5 Claims, 6 Drawing Sheets

(51) Int. Cl.
*H04L 12/835* (2013.01)
*H04L 12/823* (2013.01)

(56) References Cited

U.S. PATENT DOCUMENTS

| | | | |
|---|---|---|---|
| 7,369,498 B1 | 5/2008 | Ma et al. | |
| 7,643,418 B1* | 1/2010 | Varier et al. | 370/232 |
| 7,768,923 B2 | 8/2010 | Kumar et al. | |
| 7,936,678 B2 | 5/2011 | Paloheimo et al. | |
| 8,081,644 B2 | 12/2011 | Schliwa-Bertling et al. | |
| 8,107,369 B2 | 1/2012 | Sagfors | |
| 2011/0090795 A1* | 4/2011 | Li et al. | 370/235 |

FOREIGN PATENT DOCUMENTS

| | | |
|---|---|---|
| WO | WO/2010/107355 | 9/2010 |
| WO | WO/2008/070713 | 12/2012 |

OTHER PUBLICATIONS

Wang et al., "Design of a stabilizing AQM controller for large-delay networks based on internal model control," Computer Communications, vol. 31, Issue 10, Jun. 25, 2008, pp. 1911-1918.*

Li Yu et al., "Design of parameter tunable robust controller for active queue management based on H-infinity control theory," Journal of Network and Computer Applications 34 (2011), pp. 750-764.*

Li Yu, Maode Ma, Weidong Hu, Zibo Shi, YantaiShu, "Design of parameter tunable robust controller for active queue management based on H-infinity control theory," Journal of Network and Computer Applications 34 (2011), pp. 750-764.

K. Chavan, M. N. Belur and A. Karandikar, A Robust Active Queue Management Algorithm for Wireless Network, http://www.ee.iitb.ac.in/~karandi/pubs_dir/preprints/kanchan_ram_belur_karandikar_ieeetcst.pdf.

S. Floyd et al., "Random Early Detection Gateways for Congestion Avoidance," IEEE Trans. Networking, vol. 1, No. 4, Aug. 1993.

F. Kelly et al., "Rate Control in Communication Networks: Shadow Prices, Proportional Fairness and Stability," J. of the Operational Research Society, vol. 49, No. 3, pp. 237-252, Mar. 1998.

S.H. Low, et al., "Internet Congestion Control," IEEE Control Systems Magazine, vol. 22, No. 1, pp. 28-43, Feb. 2002.

V. Misra et al., "Fluid-based Analysis of a Network of AQM Routers Supporting TCP Flows with an Application to RED," Comp. Comm. Rev., vol. 30, No. 4, pp. 151-160, Oct. 2000.

S.H. Low, "A Duality Model of TCP and Queue Management Algorithms," IEEE/ACM Trans. Networking, vol. 11, No. 4, pp. 525-536, Aug. 2003.

H. Han et al., "TCP Networks Stabilized by Buffer-Based AQMs," Proc. of IEEE INOFCOM, Mar. 2004.

C.V. Hollot et al., "Analysis and Design of Controllers for AQM Routers Supporting TCP Flows," IEEE Trans. Automatic Control, vol. 47, No. 6, Jun. 2002.

S.H. Low et al., "Linear Stability of TCP/RED and a Scalable Control," Computer Networks Journal, vol. 43, No. 5, pp. 633-647, Dec. 2003.

K. Xu et al., "Enhancing TCP Fairness in Ad Hoc Wireless Networks Using Neighborhood RED," Proc. of ACM MOBICOM, pp. 16-28, Sep. 2003.

C.-T. Chen, Linear System Theory and Design, New York: Oxford University Press (1999).

S. Floyd et al., "The NewReno Modification to TCP's Fast Recovery Algorithm," IETF RFC 3782, Apr. 2004.

S. Athuraliya et al., "REM: Active Queue Management," IEEE Network, vol. 15, No. 3, pp. 48-53, May 2001.

B. Braden et al., "Recommendations on Queue Management and Congestion Avoidance in the Internet," IETF RFC 2309, Apr. 1998.

Chen et al., "Flow Control over Wireless Network and Application Layer Implementation," Proc. of IEEE INFOCOM, pp. 103-113, Mar. 2006.

G. Vinnicombe, "On the Stability of Networks Operating TCP-Like Congestion Control," Proc. of the IFAC World Congress on Automatic Control, Jun. 2002.

M. Allman, D. Glover, and L. Sanchez. Enhancing TCP over Satellite Channels using Standard Mechanisms. IETF RFC 2488, Jan. 1999.

North America Carrier Ethernet Switch/Router market Update, N91C-63, Frost & Sullivan, Jun. 2011.

* cited by examiner

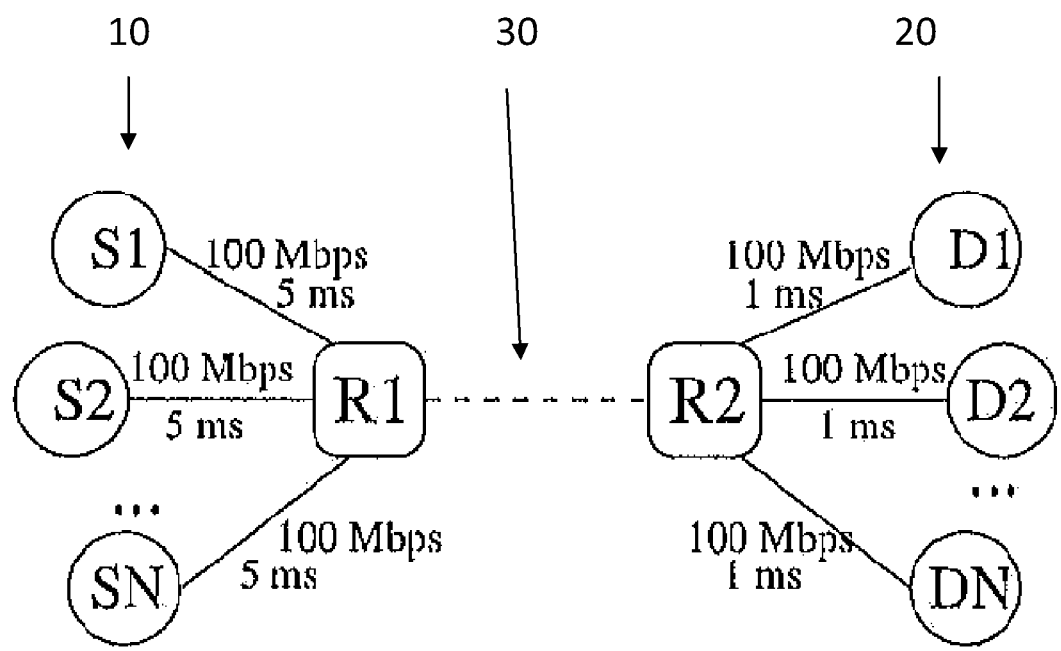
Fig. 1. A wireless bottleneck link.

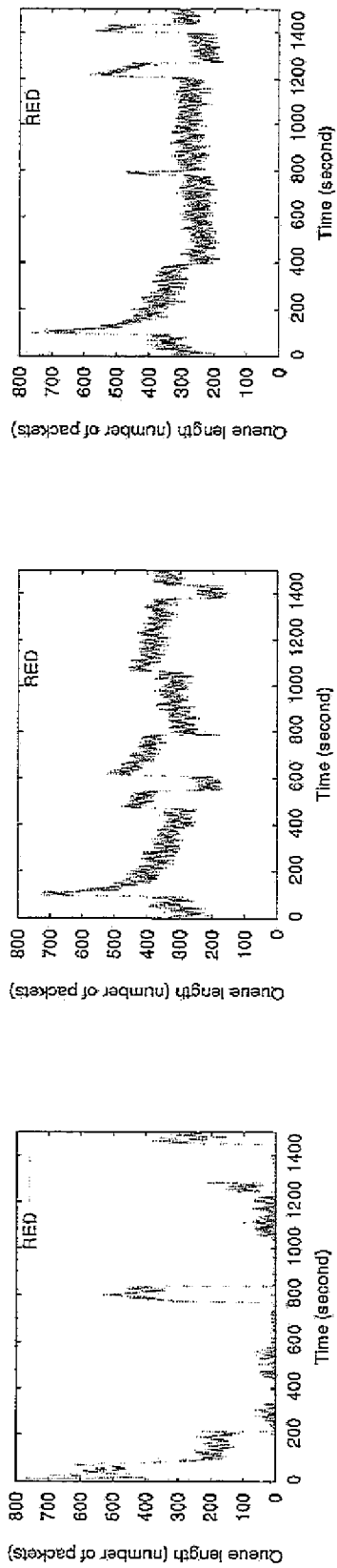
(a) $N = 20, M = 1$.  (b) $N = 100, M = 1$.  (c) $N = 20, M = 5$.
Fig. 2. Queue length dynamics under varying wireless losses in the dumbbell topology with TCP NewReno/RED.
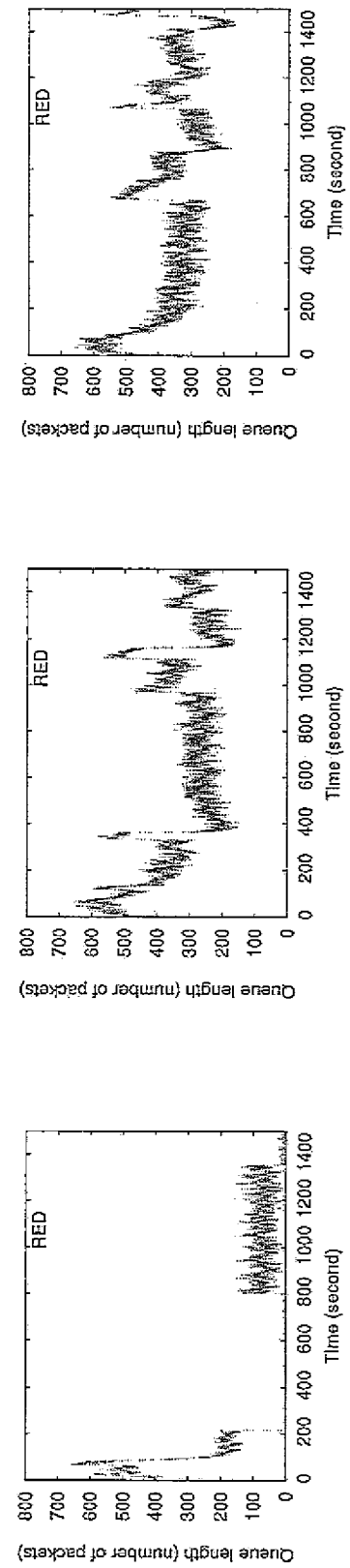
(a) $N = 20, M = 1$.  (b) $N = 100, M = 1$.  (c) $N = 20, M = 5$.
Fig. 3. Queue length dynamics under varying wireless losses in the dumbbell topology with TCP-NCL/RED.

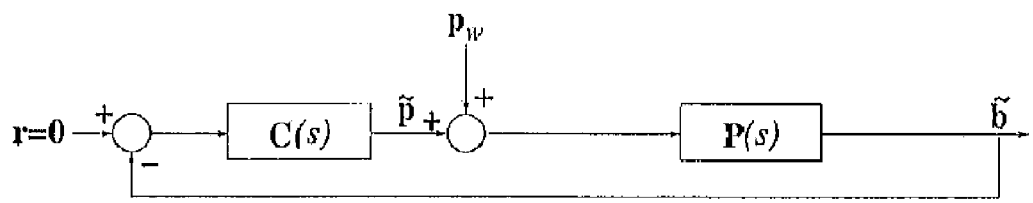
Fig. 4. Control block diagram of the linearized congestion control system.
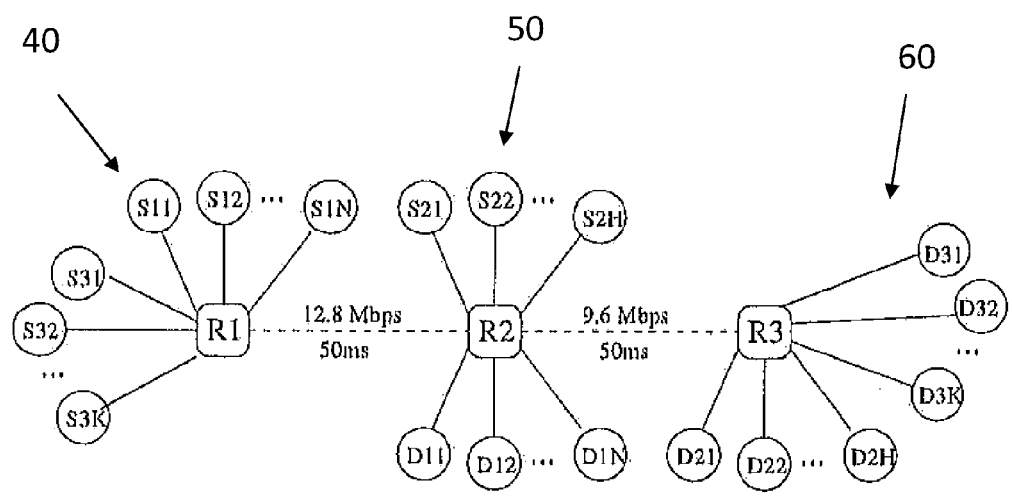
Fig. 5. Two wireless bottleneck links.

(a) $N = 100$, $M = 1$.  (b) $N = 20$, $M = 5$.

(a) Larger variations in WPER.  (b) More frequent variations in WPER.

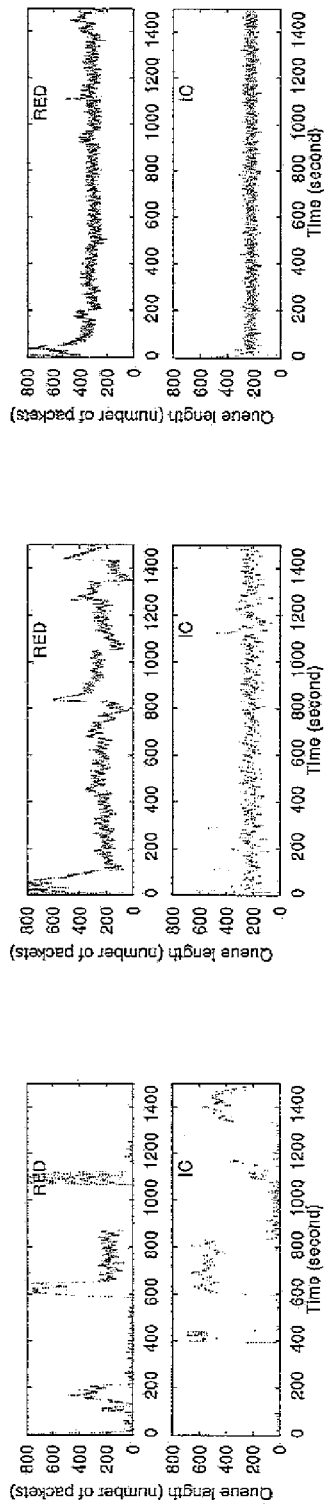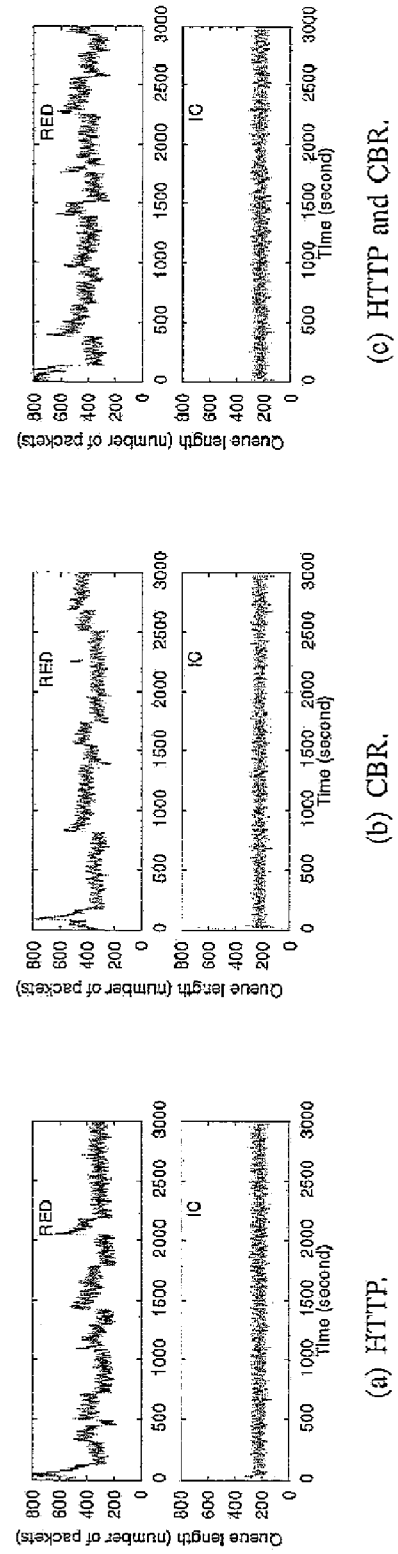
Fig. 8
Fig. 9

ENHANCING AQM TO COMBAT WIRELESS LOSSES

CROSS REFERENCE TO RELATED APPLICATIONS

The present application claims the benefit of U.S. patent application Ser. No. 61/653,143, filed May 30, 2012 which is hereby incorporated by reference in its entirety.

BACKGROUND OF THE INVENTION

1. Technical Field

The subject matter disclosed herein relates to creating a stable backlog at an internet router buffer that is under active queue management (AQM) in the face of wireless losses that may be misinterpreted as losses of data due to data congestion at the router.

2. Description of Related Art

Congestion control regulates the amount of data traffic injected by end systems into communication networks, preventing persistent network overloading. In the Internet, it is a task typically implemented jointly by Transmission Control Protocol (TCP) and the queue management algorithms in a distributed manner. Running at the end systems, TCP treats packet losses as a signal of network overloading, and slows or backs off the data flow rate when any losses are detected. Running at an intermediate router, the queue management algorithm monitors the queue length of a router buffer, and drops packets based on buffer occupancy.

Active queue management (AQM) is a class of queue management algorithms first proposed in the 1990s. Contrary to the traditional queue management algorithms that do not drop packets until buffer overflow, AQM probabilistically drops packets before buffer overflow based on a dropping rate determined from the past and/or present queue lengths. This keeps the backlog at router buffers small and desynchronizes the back offs of the end systems. When operating effectively, AQM stabilizes the packet queue around a low level, so that 1) the end-to-end delay can be reduced and the delay jitter can be smoothed out; 2) sufficient buffer space is maintained to absorb traffic with data bursts, and 3) the bottleneck link is kept backlogged and thus fully utilized.

An AQM for maintaining a stable and small queue size by minimizing the uncertainty imposed by any external disturbance using H-infinity control theory is disclosed in the article. Li Yu et al., "Design of parameter tunable robust controller for active queue management based on H-infinity control theory," *Journal of Network and Computer Applications* 34 (2011), pp 750-764. The Yu paper discloses a closed-loop feedback system representing the TCP process and AQM strategy where the queue length is used as the output and the reference queue size is used as the input. Communication errors and network congestions are treated as external disturbances. In the paper there is a comparison of the queue size of the proposed AQM controller (R-PID) versus random early detection (RED) and other common AQM controllers, which shows that the Yu controller provides a stable and small queue size. However, this prior art controller only deals with wired networks, i.e. wireless losses are not covered.

The next generation network is expected to be a heterogeneous network of networks, including both wired and wireless components. Wireless networks may extend beyond access networks to backhaul networks, and even backbone networks. The characteristics of wireless links pose great challenges to the existing congestion control mechanisms, which are designed based on certain principles that may not hold in the wireless environment. Most notably, signals propagating over wireless links are subject to severe interference, noise, and propagation loss. Packets transmitted over wireless links may be damaged to an extent beyond the recovery capability of error control codes (if any), and are thus discarded. This constitutes another cause of packet loss, in addition to congestive loss, which was discovered by the present inventors. The implications of wireless losses on the design of congestion control are two-fold.

First, TCP tends to misinterpret wireless losses as congestive losses and backs off or reduces the data flow rate unnecessarily, thereby possibly under utilizing the network capacity. The problem has motivated numerous TCP variants in the literature; but, this is not the focus of the present invention. Rather, it is based on the fact that traditional AQM mechanisms designed for wired networks perform badly in networks with wireless links because packet loss in a wireless network is more commonly due to garbled packets and link disconnect, as wireless links are subject to interference, noise and propagation loss that are not present in wired networks.

Second, the extra source of packet losses may interfere with the normal operation of AQM, which communicates implicitly with TCP via active packet drops. When many TCP flows are sharing a bottleneck wireless link, it is unlikely that a large fraction of them will experience wireless losses simultaneously (unless a link is broken). Thus, spurious back offs due to wireless losses would affect the aggregate transmission of all flows much less severely than when there are only a few flows. The wireless link will still be kept backlogged.

An article by K. Chavan et al., "A Robust Active Queue Management Algorithm for Wireless Network," shows another AQM algorithm for a bottleneck node in a wireless network. This article can be found at the web site http://www.ee.iitb.ac.in/~karandi/pubs_dir/preprints/kanchan_ram_belur_karandikar_ieeetcst.pdf. According to this paper a wireless link has a capacity that is time varying due to multipath fading and mobility. It describes a robust controller design method that can maintain the queue length close to an operating point with time varying link capacity as an external disturbance. The design of the controller is based on the H-infinity control method. This design is also compared with the RED algorithm and the proposed AQM on the right (RQM). This prior art also shows a stable queue size and converges much faster than RED. Nevertheless, while this prior art deals with wireless networks, it considers the bandwidth variation in the wireless networks but does not consider wireless losses. Thus, this paper fails to provide a solution for wireless losses (which means the buffer queue may fluctuate under wireless losses).

Random early detection (RED) is one of the most representative AQM algorithms. However, the present inventors have determined that it fails to maintain a stable backlog under wireless losses. As proposed by S. Floyd et al., "Random Early Detection Gateways for Congestion Avoidance," *IEEE Trans. Networking,* Vol. 1, No. 4, August 1993, RED demonstrates the inherent advantage of AQM in helping the network operate in the optimal region of high throughput and low delay. However, parameter tunings and new variants of RED invariably adopted the trial-and-error approach due to the difficulties in understanding the dynamics of TCP/AQM.

The fluid models of TCP/AQM provide a basis for systematic design and analysis of AQM. See for example, F.

Kelly et al., "Rate Control in Communication Networks: Shadow Prices, Proportional Fairness and Stability," *J of the Operational Research Society*, Vol. 49, No. 3, pp. 237-252, March 1998; S. H. Low, et al., "Internet Congestion Control," *IEEE Control Systems Magazine*, Vol, 22, No. 1, pp. 28-43, February 2002; and V. Misra et al., "Fluid-based Analysis of a Network of AQM Routers Supporting TCP Flows with an Application to RED," *Comp. Comm. Rev.*, Vol. 30, No. 4, pp. 151-160, October 2000, which are incorporated herein by reference. The optimization-based approach of Low interprets TCP/AQM as a distributed algorithm for solving a utility maximization problem, subject to capacity constraints. See the Kelly et al. article and S. H. Low, "A Duality Model of TCP and Queue Management Algorithms," *IEEE/ACM Trans. Networking*, Vol. 11, No. 4, pp. 525-536, August 2003. The major focus is on the optimal solutions attained at equilibrium. However, transient responses of AQM are mostly ignored.

The control-theoretic approach views Internet congestion control as a non-linear control system. The system is first linearized around its equilibrium so as to analyze the dynamics of TCP/AQM around the equilibrium. This enables parameter tuning of RED and design of new AQM algorithms based on frequency-domain analysis, which is powerful in improving the transient response of AQM and guaranteeing the stability of the linear system. See H. Han et al., "TCP Networks Stabilized by Buffer-Based AQMs," Proc. of *IEEE INOFOCOM*, March 2004; C. V. Hollot et al., "Analysis and Design of Controllers for AQM Routers Supporting TCP Flows," *IEEE Trans. Automatic Control*, Vol. 47, No. 6, June 2002; and S. H. Low et al., "Linear Stability of TCP/RED and a Scalable Control," *Computer Networks Journal*, Vol. 43, No. 5, pp. 633-647, December 2003. The Han article discloses designs with a proportional-integral (PI) controller for the general network topology. However, it focuses on designing a PI controller in wired networks and it uses a non-zero proportional part.

The global stability and region of attraction of Internet congestion control have been studied in the context of a non-linear system. These studies are principally concerned with whether the system will converge to equilibrium starting from a feasible initial status not necessarily close to the equilibrium. Among the studies, one by Fan et al., "Robustness of Network Flow Control against Disturbances and Time-Delay," *Syst. Contr. Lett.*, Vol. 53, No. 11, pp. 1329, September 2004, examined the robustness of the network flow control against disturbances. Yet, the AQM in Fan is static rate-based, which determines the packet dropping rate as a function of the instantaneous incoming data rate, as opposed to the queue length.

In adapting AQM to wireless networks, the inter-flow fairness in ad-hoc networks should be considered. K. Xu et al., "Enhancing TCP Fairness in Ad Hoc Wireless Networks Using Neighborhood RED," *Proc. of ACM MOBICOM*, pp. 16-28, September 2003. This fairness can be improved by virtually aggregating packets queued in those interfering nodes to one queue, and applying AQM to manage the queue. The fairness issue is complementary to the focus of the present invention, i.e. stability and robustness against wireless losses.

Two solutions to the problem of backlog at routers in the face of wireless losses suggest themselves. First, a TCP enhancement could be designed that can fully differentiate between congestive and wireless losses. Unfortunately, this is hardly attainable due to the limited network information available to the end systems. Experiments by the present inventors demonstrate that the performance problem of RED persists when the end systems are running wireless TCP enhancements like TCP-NCL, a serialized timer approach which has been shown to be very successful in differentiating congestive and wireless losses. A second possible solution is to use packet marking instead of packet dropping to signal network congestion. However, a globally enabled marking scheme is impractical due to heterogeneity of the Internet. For example, explicit congestion notification (ECN) is the most widely adopted marking scheme, but is generally disabled by default in several versions of Microsoft Windows.

None of the prior art solutions are designed to cope with the fluctuation in buffer occupancy induced by wireless losses, a problem recently uncovered by the present inventors. Thus it would be beneficial if there were a method for stabilizing the buffer occupancy under wireless losses.

SUMMARY OF THE INVENTION

The present invention is directed a method and apparatus for stabilizing the backlog at an internet router buffer that is under active queue management (AQM) in the face of wireless losses. The problem of backlog instability is reduced according to the present invention by using loss-based AQM enhancements, which make use of packet drops for signaling network congestion.

The invention is a novel variant of the active queue management (AQM) algorithm running at the routers that form the core of the Internet, interconnecting end systems such as web servers, PC, laptops and smart phones and relaying data packets between these end systems. In cooperating with Transmission Control Protocol (TCP) running at end systems, AQM regulates the amount of data traffic on the Internet. In each router, data packets pending for relaying are stored at the router buffer. Based on the buffer occupancy, AQM drops or marks a subset of the data packets. When TCP of an end system detects a packet drop/mark among its transmitted packets, it slows down the transmission. Therefore, the dropping/marking rate by AQM controls the aggregate transmission of end systems.

The process of the present invention aims at keeping the router buffer occupancy stably at a low level when the network has wireless elements and where loss packets in the wireless section are not indicative of network congestion. This ensures that the outward links of the routers can be constantly utilized. Moreover, buffer occupancy determines the delay experienced between when a data packet arrives at the router and when the packet is forwarded. Thus, stable, low buffer occupancy reduces the transmission delay and the fluctuations in the transmission delays across time. This is particularly important to real-time traffic, such as video and audio, whose performance is heavily affected when delay elongates and/or fluctuates.

In implementing an illustrative embodiment a model is created of the dynamics of the congestion control system around its equilibrium by a linear control system, and the interaction of wireless losses and AQM in this theoretical control framework is studied. By employing the queue size as the system output, wireless losses are considered as disturbances to the system. Furthermore, according to the present invention a family of solutions is proposed for stabilizing the queue size against wireless losses based on the internal model principle. See C.-T. Chen, *Linear System Theory and Design*, New York: Oxford University Press (1999), which is incorporated herein by reference. The internal model principle rejects disturbances, or forces the part of the output due to disturbances to asymptotically converge to zero, by including a model of the disturbances, or poles of the disturbances, as part of the feedback control loop. In the case of the congestion control system, it can be realized by simply modifying the formula for the packet dropping rate in AQM.

The present inventors are the first to apply the Internal Model Principle in an AQM system to solve the wireless losses problem in the network routers for improving network performance. The proposed AQM computes a packet marking/dropping rate based on the internal modeling principle, which comes from control theory and is applied to the area of computer networks for the first time by the present invention. Applying this principle makes the AQM adaptive to the dynamics of wireless networks, most notably the changes in the intensity of wireless losses.

The application of the Internal Model principle in combating wireless losses offers the following advantages:

1. It enables AQM to adjust the packet dropping rate to compensate for the packet drops due to wireless losses without any specific knowledge about the wireless packet error rate (WPER); and 2. It is realized as an independent module in AQM, and thus offers good extensibility to incorporate other AQM enhancements, such as for improving inter-flow fairness in ad-hoc networks.

In an illustrative embodiment of the invention the backlog at a router buffer is tracked and it compared to a tunable reference queue level in a system providing active queue management (AQM) algorithms for controlling the router. In this way a large drop rate due to congestion can be distinguished from one due to wireless losses. In particular, the router buffer is filled only due to congestions. The AQM algorithms according to the invention are based on the Internal Model principle from control theory and packet dropping probabilities are determined based on the instantaneous queue size via a compensator function that incorporates a model of wireless losses.

The compensator function includes an integral controller (IC) as one of its elements. This IC performs the steps of comparing the instantaneous queue size (router buffer backlog) with the reference queue level and adding to the packet dropping probability by an amount proportional to the difference between instantaneous queue size and the reference queue level. The amount added is positive if the instantaneous queue size exceeds the reference queue level and is negative it if does not.

By assuming the intensity of wireless losses to be slowly time varying, the integral controller (IC) can be devised as an embodiment of the Internal Model principle. The design rules for the IC have been developed, and simulations run by the present inventors show that the IC is capable of maintaining stable queue sizes and performing effective congestion avoidance against wireless losses. Its performance is maintained in the presence of perturbing traffic flows (e.g. HTTP traffic).

The present invention considers buffer based AQM variants, which are widely used in the Internet to determine the packet dropping rate from the queue length. Thus, its implementation is made easier.

A relatively short and stable queue length in the buffer as provided by the present invention causes:
- minimal end-to-end transmission delay (the longer the queue means the longer time it takes to transmit a packet)
- minimal jitter (the delay between successive packets is more or less constant if queue length is short and stable)
- good utilization of bottleneck links from time to time (utilization is zero when there is no data packet in the buffer)
- robust enough to handle a sudden burst in data traffic as a sufficient amount of buffer space is maintained to absorb burst traffic.

These features are particularly desirable for real-time and/or multimedia data whose performance is heavily affected when delay and jitter extend and/or fluctuate.

It is also worth noting that according to the present invention packets are dropped roughly proportionally to the bandwidth share of each flow, thereby improving fairness over the traditional queue management algorithms on the per-link basis. Moreover, as noted earlier the present invention offers good extensibility to accommodate enhancements.

BRIEF DESCRIPTION OF THE DRAWINGS

The foregoing and other features of the present invention will be more readily apparent from the following detailed description and drawings of illustrative embodiments of the invention wherein like reference numerals refer to like parts throughout the various figures unless otherwise specified and in which:

FIG. 1 is a block diagram of the wired and wireless topology in which the present invention is employed;

FIGS. 2A, 2B and 2C are graphs of queue length dynamics under varying wireless losses in the dumbbell topology with TCP NewReno/RED;

FIGS. 3A, 3B and 3C are graphs of the queue length dynamics under varying wireless losses in the dumbbell topology with TCP-NCL/RED;

FIG. 4 is a control block diagram of the linearized congestion control system of the present invention;

FIG. 5 is a block diagram of an alternative wired and wireless topology in which the present invention is employed;

FIGS. 8A, 8B and 8C are graphs comparing queue length dynamics between RED and the present invention with different bottleneck link parameters;

FIGS. 9A, 9B and 9C are graphs comparing queue length dynamics between RED and the present invention with the presence of other traffic;

DETAILED DESCRIPTION

Figure 6:
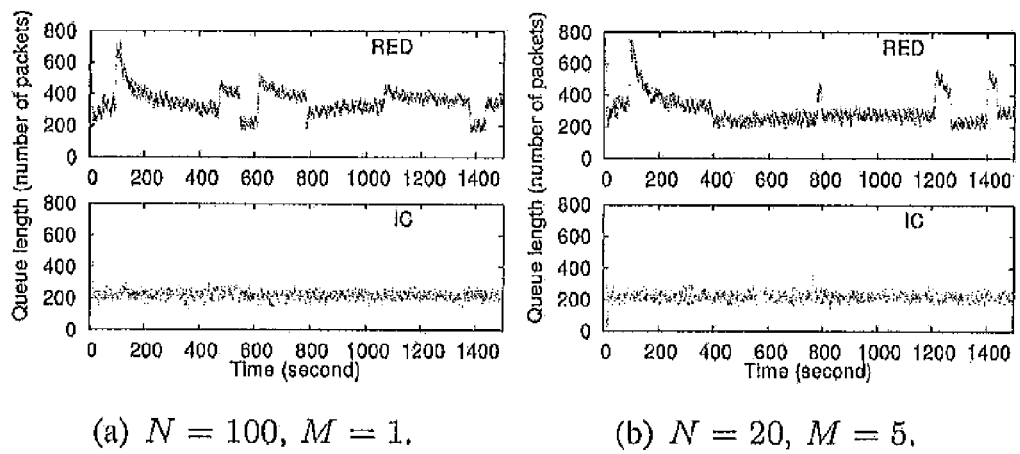
FIGS. 6A and 6B are graphs comparing queue length dynamics between RED and the present invention under different configurations.
Figure 7:
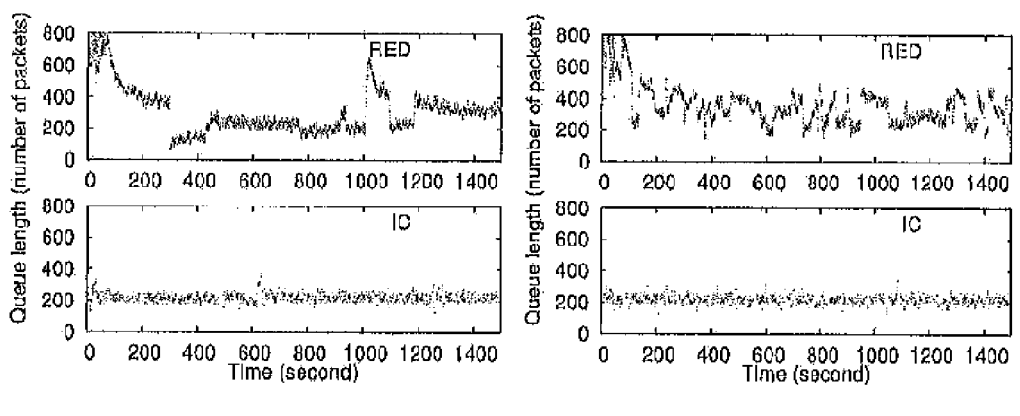
FIGS. 7A and 7B are graphs comparing the effects of larger variations in WPER and more frequent variations in WPER, respectively, between RED and the present invention.

The network topology as shown in FIG. 1 has two wired LANs 10, 20 connected via a full duplex wireless link 30. A total of N pairs of source Si and destination Di terminals are connected via the wireless bottleneck link with, e.g., a capacity of 15 Mbps, and a propagation delay of 50 ms. Within each pair (Si, Di), M long-lived TCP flows are set up from Si to Di. The flows are simulated for 1400 seconds. The size of a link buffer is 800 packets. WPER of the bottleneck link is varied. Time is divided into periods, each of exponential distribution, with a mean of 100 seconds. At the beginning of each period, WPER of the bottleneck link is determined from a uniform distribution over [0, 4%], and is then kept constant during that period. RED is employed as the AQM algorithm in this study. The parameters are set based on the result of the frequency domain analysis in the Hollot article.

FIGS. 2A-2C show the queue dynamics when the end systems are running TCP NewReno as described in S. Floyd et el., "The NewReno Modification to TCP's Fast Recovery Algorithm," *IETF RFC* 3782, April 2004, which is incorporated herein by reference. TCP NewReno is a standardized TCP variant. When there are only 20 flows traversing the bottleneck link as shown in FIG. 2A, spurious back offs of some flows due to wireless losses has a considerable affect on the aggregate transmission of the flows. The aggregate connection goodput, i.e., the number of useful information bits delivered by the network to a certain destination per unit of time, is measured to be around 12 Mbps, or 80% of the link capacity, and the backlog is zero most of the time. In this case, the major concern is to enhance wireless TCP for improving link utilization.

When the number of flows increases to 100 by increasing either the number of source-destination pairs N, or the number of flows per pair M, the aggregate transmission of the flows is able to keep the bottleneck link backlogged and fully utilized, despite the presence of wireless losses. This is clearly exhibited in FIGS. 2B and 2C. A large N corresponds to a large wired LAN. A large M can correspond to multiple simultaneous file transfers, or TCP enhancements that use parallel TCP sockets for better performance over wireless networks. In this case, the major concern shifts from link utilization to the backlog dynamics under wireless losses. It should be noted that the backlog fluctuates severely across time due to the time-varying wireless losses. Thus, an RED algorithm for AQM is not able to maintain a stable, small backlog under wireless losses.

In order to investigate the cause of the backlog fluctuations under time varying wireless losses, another set of tests was conducted under time-invariant wireless losses. It was observed during these tests that different WPERs essentially cause the backlog to converge to different levels. Thus, time-varying wireless losses effectively force the backlog to switch among different equilibrium levels from time to time. Moreover, the sluggish transient response of RED in attaining such switching induces further backlog fluctuations.

It was next decided that if TCP can be enhanced to fully differentiate between congestive losses and wireless losses, the impact of wireless losses on the congestion control system would still be minimal and the fluctuations could be reduced. FIGS. 3A-3C exhibit the queue dynamics when the end systems are running TCP-NCL, a wireless TCP enhancement that has been shown to be very successful in differentiating between congestive and wireless losses. When there are only 20 flows as shown in FIG. 3A, TCP-NCL has improved the link utilization over TCP NewReno. The link is backlogged from the 800th second to the 1300th second, and the aggregate connection goodput is measured to be around 14 Mbps, or 93% of the link capacity.

When the number of flows increases to 100 as shown in FIGS. 3B and 3C (N=20×M=5), the link is always backlogged. Again, it should be noted that the backlog fluctuates severely. Although TCP can be enhanced to attain more accurate differentiation between congestive losses and wireless losses, the accuracy in differentiation is nevertheless constrained by the limited information on the network status available to end systems. On the other hand, the equilibrium backlog level is very sensitive to the change in WPER. The fluctuation will persist even when only a small fraction of wireless losses are misinterpreted by TCP as congestive losses.

Therefore, the backlog fluctuation cannot be reduced significantly by simply enhancing TCP only. Instead, the key to maintaining a small, stable backlog under wireless losses is for AQM to direct the backlog to track a fixed reference level despite the variations in WPER.

In order achieve this goal first a non-linear system of TCP/AQM is constructed. Then it is linearized around its equilibrium and its frequency domain representations are developed. A generic communication network with a set of TCP flows F and a set of bottleneck links L are then considered, taking into consideration that a non-bottleneck link delays packets for almost a constant amount of time and can thus be modeled as part of the propagation delay experienced by a traffic flow traversing that link. The analysis is focused on the case of unipath static routing in which a Flow f traverses one identified path $L_f \subseteq L$.

The non-linear system of TCP/AQM is a time-delay system. There are time lags between when a packet is dropped over Link l, and when the source of Flow f detects the loss, and between when the source of Flow f injects data into the network, and when Link l receives the data. For any time instant t, the first time lag is defined as backward delay, $\overleftarrow{d_{fl}}(t)$, and the latter as forward delay, $\overrightarrow{d_{fl}}(t)$, denoting the round-trip time of Flow F as $d_f(t)$. It can be established that:

$$\overrightarrow{d_{fl}}(t) + \overleftarrow{d_{fl}}(t) = d_f(t) \tag{1}$$

wherein the routing matrix associated with the equilibrium forward delays is:

$$[R_F(s)]_{lf} \triangleq \begin{cases} e^{-s\overrightarrow{d_{fl}}} & \text{Flow } f \text{ traverses Link } l \\ 0 & \text{otherwise} \end{cases} \tag{2}$$

and further denote $R \triangleq R_F(0)$

Each TCP Flow f adjusts its congestion window $W_f(t)$ based on the aggregate packet dropping probability $q_f(t)$ directed by the additive-increase/multiplicative-decrease (AIMD) algorithm. Denote the instantaneous transmission rate of Flow f as $x_f(t)$. We have:

$$\dot{W}_f(t) = x_f(t - d_f)(1 - q_f(t))\frac{1}{W_f(t)} - x_f(t - d_f)q_f(t)\frac{W_f(t)}{2} \tag{3}$$

In wireless networks, $q_f(t)$ is determined as:

$$q_f(t) \approx \sum_{l \in L} R_{lf}\left(p_l(t - \overleftarrow{d_{fl}}) + p_{wl}(t - \overleftarrow{d_{fl}})\right) \tag{4}$$

where $p_l(t)$ and $p_{wl}(t)$ are the packet dropping probabilities over Link l due to AQM and wireless losses, respectively. It should be noted that a packet needs to be stored in the buffer managed by AQM, before being transmitted over the link subject to wireless losses. Thus, the delay between packet transmission and packet drop due to wireless losses is slightly greater than the delay between packet transmission and packet drop due to AQM. Nevertheless, the difference is assumed to be negligible for simplicity.

For each link l, the instantaneous queue size $b_l(t)$ is determined by the aggregate incoming data rate $y_l(t)$ and the link capacity $c_l$, following the system dynamics:

$$\dot{b}_l(t) = y_l(t) - c_l \tag{5}$$

$y_l(t)$ is the sum of the time-delayed source rates of all flows traversing Link l:

$$y_l(t) = \sum_{f \in F} R_{lf} x_f(x - \overrightarrow{d_{fl}}) \approx \sum_{f \in F} R_{lf} \frac{W_f(t - \overrightarrow{d_{fl}})}{d_f(t)} \tag{6}$$

The approximation above is made based on the assumption that $d_f(t)$, which is determined by the collective transmission of many flows, varies in a larger timescale than $x_f(t)$.

Besides data transmission and packet dropping, the dynamics of flows and links are also coupled via RTTs of the flows. where RTT is the sum of the queue delays for all links traversed and the round-trip propagation delay, $\tau_f$:

$$d_f(t) = \tau_f + \sum_l R_{lf} \frac{b_l(t)}{c_l} \tag{7}$$

Denote the Laplace transforms of $(\tilde{p}_l(t); l \in L)$, $(p_{wl}(t): l \in L)$, and $(\tilde{b}_l(t): l \in L)$ as $\tilde{p}(s)$, $p_w(s)$, and $\tilde{b}(s)$, respectively. Then linearize the non-linear system as in the articles by S. Athuraliya et al., "REM: Active Queue Management," *IEEE Network*, Vol. 15, No. 3, pp. 48-53, May 2001; B. Braden et al., "Recommendations on Queue Management and Congestion Avoidance in the Internet," *IETF RFC* 2309, April 1998; C.-T. Chen, *Linear System Theory and Design*, New York: Oxford University Press, 1999; and M. Chen et al., "Flow Control over Wireless Network and Application Layer Implementation," *Proc. of IEEE INFOCOM*, pp. 103-113, March 2006, all of which are incorporated herein by reference. The linearization of the non-linear system is around its equilibrium attained with $p_w(t)=0$, and applying the Laplace transform to the resulting linear system. Next a plant transfer function matrix, $P(s)$, is defined as the transfer function from $(\tilde{p}(s) + p_w(s))$ to $\tilde{b}(s)$, and we obtain:

$$P(s) = -\left(sI + R\mathrm{diag}\left(\frac{W_f}{d_f^2}\right)R^T \mathrm{diag}\left(\frac{1}{c_l}\right)\right)^{-1} \cdot R_F(s) \tag{8}$$

$$\mathrm{diag}\left(\frac{e^{-sd_f}}{\left(s + \frac{q_f W_f}{d_f}\right)q_f}\right) R_F(-s)^T$$

$P(s)$ represents the interaction of the TCP dynamics, queue dynamics, and routing. The stability of this open-loop system can be established by the following lemma as in the Han article.

Lemma 1: The system specified in the Fan article is stable if R is of full row rank. AQM determines p(t) based on b(t). In the frequency domain, this corresponds to taking $\tilde{b}(s)$ as the input and producing $\tilde{p}(s)$ as the output, which can be represented by a transfer function matrix of dimension $|L| \times |L|$, denoted as C(s). The control loop is therefore closed, as shown in FIG. 4.

The stability of this closed-loop system can be established by the following lemma.

Lemma 2: The system in FIG. 4 is stable if de(I+P(s)C(s)) contains zeros on the open left half plane (OLHP) only. Finally, the role of wireless losses is represented by Pw in FIG. 4. Together with $\tilde{p}(s)$, $p_w(s)$ determines the system output $\tilde{b}(s)$ via P(s). However, while $\tilde{p}(s)$ is in turn determined by $\tilde{b}(s)$ via C(s) and thus part of the feedback control loop, Pw(s) is not in the loop, but serves as an external disturbance to the system.

It is also necessary to develop an approach to track the backlog to a reference level despite the presence of wireless losses, based on the frequency domain representation of the TCP/AQM system under wireless losses as shown in FIG. 4. The objective is to maintain a stable, small backlog under wireless losses.

In the time domain, the prescribed objective is met if (t), the backlog deviation from the equilibrium level, converges asymptotically to zero. This means that b(s) does not contain any unstable poles in the frequency domain.

First, the following relationship between $\tilde{b}$ and Pw should be noted:

$$\tilde{b}(s) = (I + P(s)C(s))^{-1} P(s) p_w(s) \tag{9}$$

On the other hand, without loss of generality, the disturbance of wireless losses, Pw, can be expressed as:

$$p_w(s) = \frac{1}{\phi(s)} k(s) \tag{10}$$

where $\phi(s) \in F$ contains all the unstable poles of Pw and $k(s) \triangleq \phi(s) Pw(s)$. F denotes the set of the rational functions in s. Obviously, all entries in k(s) will not contain any unstable poles. The unstable poles determine the asymptotic behavior of Pw(s). Thus, $1/\phi(s)$ is often referred to as a model of the disturbance. It follows that:

$$\tilde{b}(s) = \frac{1}{\phi(s)} (I + P(s)C(s))^{-1} P(s) k(s) \tag{11}$$

When the system in FIG. 4 is stable, the unstable poles of $\tilde{b}(s)$, if any, come from the unstable poles contained in $\phi(s)$. To attain disturbance rejection of Pw, or to prevent the unstable poles contained in $\phi(s)$ from becoming poles of $\tilde{b}(s)$, the internal model principle proposes to insert the model of disturbance $1/\phi(s)$ inside the feedback loop.

The design of AQM determines C(s), whereas the plant transfer function P(s) is invariant across different AQM algorithms. Therefore, $1/\phi(s)$ is placed inside the feedback loop by selecting C(s) as:

$$C(s) = \frac{1}{\phi(s)} \Lambda_N(s) \Lambda_D(s)^{-1} \tag{12}$$

where $\Lambda_N(s), \Lambda_D(s) \in \mathbb{F}^{|L| \times |L|}$ are coprime diagonal matrices, $\det(\Lambda_N(s))$ does not share roots with $\phi(s)$, and $\det(\Lambda_D(s))$ does not have any roots on the closed right half plane (CRHP). C(s) is constrained to be diagonal so that each intermediate router can execute the AQM algorithm in a distributed fashion without incurring the need of exchanging the instantaneous queue sizes with each other.

Theorem 1: Consider the system in FIG. 4 with P(s) and C(s) as specified in the Fan and Hollot articles, respectively. Suppose the conditions of Lemmas 1 and 2 hold so that both open-loop and closed-loop stabilities are established. Let $P(s)=D^{-1}(s)N(s)$ be a left co-prime factorization. The system attains disturbance rejection if det(N(s)) does not contain zeros at the roots of $\phi(s)$. This can be established by substituting equation (12) into equation (11), which gives:

$$\tilde{b}(s)=\Lambda_D(s)(\phi(s)D(s)\Lambda_D(s)+N(s)\Lambda_N(s))^{-1}N(s)k(s) \quad (13)$$

Disturbance rejection is attained if none of the zeros of $det(\phi(s)D(s)\Lambda_D(s)+N(s)\Lambda_N(s))$, which include the poles of b(s) as a subset, are on CRHP. For the roots of $\phi(s)$ (which are unstable poles of Pw(s) and thus on CRHP), the determinant reduces to:

$$det(N(s)\Lambda_N(8))=det(N(s))det(\Lambda_N(s)) \quad (14)$$

This is non-zero since neither $det(\Lambda_N(s))$ nor $det(\Lambda_N(s))$ contains zeros at the roots of p(s) by assumption.
For $s \in \{s | \Re(s) \geq 0 \text{ and } \phi(s) \neq 0\}$:

$$det(\phi(s)D(s)\Lambda_D(s)+N(s)\Lambda_N(s))= \quad (15)$$
$$det(D(s))det(\Lambda_D(s))\cdot det(\phi(s)I+P(s)\Lambda_N(s)\Lambda_D(s)^{-1})=$$
$$\phi(s)^{|L|}det(D(s))det(\Lambda_D(s))\cdot det(I+P(s)C(s))$$

The three determinants in the final expression are now considered one by one. As R is of full row rank, P(s) does not have any unstable poles and thus det(D(s)) does not contain any zeros on CRHP. Neither $det(\Lambda_D(s))$ nor $det(I+P(s)C(s))$ contain zeros on CRHP by assumption.
Note that CRHP is a subset of $$\{s|\phi(s)=0\} \cup \{(s)|\Re(s) \geq 0 \text{ and } \phi(s) \neq 0\} \quad (16)$$

Thus, we conclude that $det(\phi(s)I+P(s)\Lambda_N(s)\Lambda_D(s)^{-1})$ does not contain zeros on CRHP.

When det(N(s)) does contain zeros at some roots of $\phi(s)$, there will be some cancellations of unstable zero-pole pairs between C(s) and P(s). This violates the condition of total stability, which means that every possible input-output pair of the system is bounded-input-bounded-output (BIBO) stable. It is one of the physical constraints that a practical system should meet.

The attained disturbance rejection is robust against perturbation to P(s), $\Lambda_N(s)$, and $\Lambda_D(s)$, as long as the mild assumptions of Theorem 1 continue to hold after the perturbation. In practice, the TCP AIMD parameters, routing topologies, and network capacities may change over time, leading to such perturbation. The AQM design specified in the Hollot article can nonetheless maintain the robustness against wireless losses.

Remark 3: The attained disturbance rejection is not robust against errors in implementing $\phi(s)$. Consider when $\phi(s)$ is inaccurately implemented as $\tilde{\phi}(s)$, C(s) thus becomes:

$$C(s)=\frac{1}{\tilde{\phi}(s)}\Lambda_N(s)\Lambda_D(s)^{-1} \quad (17)$$

It follows that $\tilde{b}(s)$ contains the stable poles only while $\tilde{b}2(s)$ contains the unstable poles of $\phi(s)$, and represents the steady state errors in tracking the backlog to a reference queue size due to the inexact cancellation of zeros between $\tilde{\phi}(s)$ and $\phi(s)$.

$$\tilde{b}(s)=\underbrace{\Lambda_D(s)(\tilde{\phi}(s)D(s)\Lambda_D(s)+N(s)\Lambda_N(s))^{-1}N(s)k(s)}_{\tilde{b}_1(s) \triangleq}+ \quad (18)$$
$$\underbrace{\Lambda_D(s)(\tilde{\phi}(s)D(s)\Lambda_D(s)+N(s)\Lambda_N(s))^{-1}N(s)k(s)\frac{\tilde{\phi}(s)-\phi(s)}{\phi(s)}}_{\tilde{b}_2(s) \triangleq}$$

Nevertheless, it is still very meaningful to apply the Internal Model principle with inexact implementation of p(s). This reduces the steady state errors compared to when the principle is not applied. For example, consider the simple case that $\phi(s)=s-a$ and $\tilde{\phi}(s)=s-a+\epsilon$, where a and $\epsilon$ represent an unstable pole and the error involved in implementing $\phi(s)$, respectively. Then $\tilde{b}2(s)$ reduces to:

$$\tilde{b}_2(s)=\Lambda_D(s)(\tilde{\phi}(s)D(s)\Lambda_D(s)+N(s)\Lambda_N(s))^{-1}\cdot N(s)k(s)\frac{\epsilon}{s-a} \quad (19)$$

which is proportional to $\epsilon$. Therefore, the steady state error can be maintained at a minimal level with a good approximate implementation of $\phi(s)$.

Generally, Theorem 1 can be applied in two directions. On the one hand, when $\phi(s)$ is known, an appropriate C(s) can be constructed to yield a desired disturbance rejection. Note that $\phi(s)$ corresponds to the "pattern" in the variation of wireless losses. Knowledge about $\phi(s)$ is a much weaker assumption than knowledge about the exact WPER. For example, wireless losses may vary periodically at a frequency, 1/T, resulting in $\phi(s)=1-e^{-Ts}$. An AQM with C(s) containing $(1-e^{-Ts})$ as the denominator can potentially help maintain a stable, small backlog under wireless losses with a periodic time varying packet loss rate. On the other hand, without any specific knowledge of $\phi(s)$, $\phi(s)$ can be designed to serve as a good approximation for the general scenarios.

The disturbance pw can be approximated as a step input function. This approximation is valid as long as the linear system under consideration converges much faster than the variations in the WPER. It follows that $\phi(s)=s$. Based on the Hollot article, the diagonal element of C(s) can be chosen as:

$$C_{ll}(S)=\frac{g_l}{s}, 1 \leq l \leq |L| \quad (20)$$

which is essentially an integral controller IC. It converts its input into the integral of that input in the time domain. The proposed IC will be part of any other C(s) satisfying the relationships set forth in the article S. H. Low et al., "Linear Stability of TCP/RED and a Scalable Control," *Computer Networks Journal*, Vol. 43, No. 5, pp. 633-647, December 2003, which is incorporated herein by reference. In the IC $\phi(s)=s$, and is the essential element fulfilling the Internal Model principle. Denote:

$$\hat{R}_F(\cdot) \triangleq \text{diag}\{c_l\}^{-1} R_F(\cdot) \text{diag}\left\{\frac{W_f}{d_f}\right\} \quad (21)$$

$$\omega_g \triangleq 0.1 \min_{l \in L, f \in F}\left(\frac{2}{d_f W_f}, \frac{1}{d_f}, \frac{\sigma_{min}^2(\hat{R}_F(0))c_l}{W_f}\right) \quad (22)$$

The following proposition gives the design rules for the IC according to the present invention.

Proposition 1: Consider again the system in FIG. 4 with P(s) and C(s) as specified in the Fan and Low articles, respectively. Suppose that R is of full row rank and g1 is chosen as g/cI. The system is closed loop stable and attains disturbance rejection of $p_w$ as specified in the Floyd article with $\phi(s)=s$ if:

$$g \leq \omega_g \cdot \frac{4\sigma_{min}^2(\hat{R}_F(0))}{\|\hat{R}_F(0)\|_1} \cdot \frac{1}{(\max_{f \in F} d_f W_f)\max_{f \in F} W_f} \quad (23)$$

In the case of homogeneous flows sharing a bottleneck link with $\max_f W_f \geq 2$, a simplified condition can be obtained as:

$$g \leq \frac{0.8(N_-)^3}{d_+^5 c^3} \quad (24)$$

where $N_-$, $d_+$, and c correspond to the lower bound for the number of flows, the upper bound for the round-trip time (RTT), and the link capacity, respectively.

In the Han article the PI controller is designed in the form of $k_I(s+z_I)/s$, which cannot be reduced to the IC of the present invention. After the discretization via the bilinear transform for an IC, the packet dropping rate for each link/can computed as:

$$p_l[k]p_l[k-1]+G_l(b_l[k]-b_l) \quad (25)$$

where $G_l=g_l/f_l*f_l$ is the sampling frequency, i.e., the frequency at which the queue size is sampled and is used to update the packet dropping rate. $p_l[k]$ and $b_l[k]$ are the step-wise packet dropping rate and queue size, respectively. The computation can be realized as an independent module in AQM, taking the queue length of a buffer as the input and computing the packet dropping rate due to the IC as the output.

Example 1

Consider the scenario illustrated in FIG. 1, with the wireless link of capacity 15 Mbps and propagation delay of 50 ms. A data packet is 1000 bytes long, and thus $c_l$=1875 packets/second. A total of N=100 homogeneous TCP flows share the link. Suppose that the equilibrium queue size is $b_l$=220 packets. For ease of comparison, $b_l$ is determined in accordance with the equilibrium level achieved by RED without wireless losses. Nevertheless, for other reasonable values of $b_l$ (generally, greater than N and less than the buffer size), all the computations follow similarly and the discussions about the IC continue to hold. It follows that $d_f$ is around 0.2 seconds.

Applying the concepts in the article, G. Vinnicombe, "On the Stability of Networks Operating TCP-Like Congestion Control," *Proc. of the IFAC World Congress on Automatic Control*, June 2002. (24) and using $d_+$=0.2 seconds, $N_-=N=100$, and $c=c_l=1875$ packets, $$g \leq \frac{0.8 \cdot 100^3}{0.2^5 \cdot 1875^3} \approx 0.3793$$

Example 2

Consider another network scenario illustrated in FIG. 5, which consists of three wired local area networks (LANs) 40, 50, 60 inter-connected to create a wide area network (WAN) via wireless links. Three sets of flows F1, F2, and F3 share the network. There are N1=60, N2=50, and N3=20 flows in F1, F2, and F3, respectively. Flows within the same set are homogeneous. Each of the flows in Fi (i=1, 2, 3) traverses from Sij to Dij, where $1 \leq j \leq 60$ for i=1, $1 \leq j \leq 50$ for i=2, and $1 \leq j \leq 20$ for i=3. Thus, there are two wireless bottleneck links whose dynamics are coupled via flows in F3. Suppose that the equilibrium queue sizes of both wireless links are b1=b2=200 packets. Let $d_i$ and $W_i$ be the equilibrium RTT and window size for each of the flows in $F_i$, respectively. It follows that:
c=(1600, 1200) packets/second
d≈(0.18, 0.22, 0.35)$^T$ seconds
W≈(4.2, 4.5, 3.2)$^T$ packets
and thus $\|\hat{R}_F(0)\|_1 \approx 0.017$.
Now, the matrix $\hat{R}_F(0)\hat{R}_F(0)^T$ becomes:

$$\hat{R}_F(0)\hat{R}_F(0)^T \approx \begin{pmatrix} 0.014 & 0.00065 \\ 0.00065 & 0.015 \end{pmatrix} \quad (26)$$

which gives $\sigma_{min}^2(\hat{R}_F(0)) \approx 0.0136$.
By (22) and (23), $$\omega_g \approx 0.1 \min\left(\frac{2}{0.35 \cdot 3.2}, \frac{1}{0.35}, \frac{0.0136 \cdot 12000}{4.5}\right) \approx 0.1786$$

$$g \leq 0.1786 \cdot \frac{4 \cdot 0.0136}{0.017} \cdot \frac{1}{(0.35 \cdot 3.2) \cdot 4.5} \approx 0.1134$$

The performance of the IC of the present invention can be compared with RED using Network Simulator (ns) Version 2.29. This is necessary because the robustness and stability of the IC have been established in the context of a linearized congestion control system, which is nonlinear in reality. The comparison is made using the topologies illustrated in FIGS. 1 and 5, respectively.

For the IC, the packet dropping rate is typically updated at a frequency of 10 Hz. Nevertheless, it has been compared in experiments with a different implementation of the IC, which updates the packet dropping rate upon the arrival of every packet, as is done in RED. The parameters of IC and RED follow Proposition 1 and the Han and Hollot articles, respectively. For RED, pMax and the queue weight are set to 0.1 and $2.6 \times 10^{-6}$, respectively. The parameters minThresh and maxThresh of RED, and the gain of IC, $G_l$, vary and are specified as necessary.

In the topology illustrated in FIG. 1, N source-destination pairs are connected via a wireless bottleneck link with capacity of c Mbps, and a propagation delay of $\tau$ ms. Within each pair (Si, Di), M long-lived TCP Reno flows are sent from Si to Di. The size of the link buffer and the reference queue size of the IC are set to 800 packets and 220 packets, respectively. Time is divided into periods, each of which follows an exponential distribution with a mean of lossP seconds. At the beginning of each period, the WPER of the bottleneck link is reset following a uniform distribution over [0, Lm].

FIGS. 6-9 plot the traces of the queue sizes under various configurations summarized in Table I. The "HTTP" and "CBR" columns in Table I indicate whether there are hypertext transfer protocol (HTTP) and constant bit rate (CBR) traffic flows coexisting with the long-lived TCP flows, respectively. The final three columns are the parameter settings of IC and RED, which are computed from the network settings.

TABLE I

NETWORK CONFIGURATIONS FOR NETWORKS WITH ONE WIRELESS BOTTLENECK LINK.

| FIG. | N | M | c | τ | $L_m$ | lossP | HTTP | CBR | $G_I$ | minThresh | maxThresh |
|---|---|---|---|---|---|---|---|---|---|---|---|
| FIG. 6(a) | 100 | 1 | 15 | 50 | 4% | 100 | No | No | $2 \cdot 10^{-5}$ | 150 | 700 |
| FIG. 6(b) | 20 | 5 | 15 | 50 | 4% | 100 | No | No | $2 \cdot 10^{-5}$ | 150 | 700 |
| FIG. 7(a) | 20 | 5 | 15 | 50 | 8% | 100 | No | No | $2 \cdot 10^{-5}$ | 150 | 700 |
| FIG. 7(b) | 20 | 5 | 15 | 50 | 4% | 20 | No | No | $2 \cdot 10^{-5}$ | 150 | 700 |
| FIG. 8(a) | 20 | 5 | 15 | 200 | 4% | 100 | No | No | $2 \cdot 10^{-7}$ | 150 | 400 |
| FIG. 8(b) | 20 | 10 | 15 | 200 | 4% | 100 | No | No | $1.6 \cdot 10^{-6}$ | 150 | 400 |
| FIG. 8(c) | 20 | 10 | 30 | 50 | 4% | 100 | No | No | $1 \cdot 10^{-5}$ | 150 | 400 |
| FIG. 9(a) | 20 | 5 | 15 | 50 | 4% | 100 | Yes | No | $2 \cdot 10^{-5}$ | 150 | 700 |
| FIG. 9(b) | 20 | 5 | 15 | 50 | 4% | 100 | No | Yes | $2 \cdot 10^{-5}$ | 150 | 700 |
| FIG. 9(c) | 20 | 5 | 15 | 50 | 4% | 100 | Yes | Yes | $2 \cdot 10^{-5}$ | 150 | 700 |

The network configurations for FIG. 6A and FIG. 6B are the same as those for FIG. 2B and FIG. 2C, respectively. It can be seen that the IC helps maintain a stable queue size throughout the simulation period. Despite the variations in WPER, the equilibrium queue size of IC tracks the reference level (220 packets) very well. However, there are occasional "spikes" in the queue dynamics with the IC. This is because the IC needs to converge to a new equilibrium packet dropping rate to maintain the same equilibrium queue size when WPER changes. Nevertheless, the transition is much smoother than that of RED since the equilibrium queue size is unchanged and the IC has better transient response than RED. Moreover, while the difference between the two equilibrium packet dropping rates should be approximately the change in WPER, the IC is self-adaptive and does not require any knowledge about WPER for completing the transition. This is an essential property of the wireless AQM enhancements based on the Internal Model principle.

In addition, FIG. 6A and FIG. 6B exhibit similar queue dynamics. Generally, in all of the simulation experiments, the queue dynamics are quite similar across different values of M for 1≤M≤10, as long as the total number of flows, N×M, is kept constant.

FIG. 7A and FIG. 7B exhibit the queue dynamics against wireless losses with larger variations and more frequent variations in WPER, respectively. Correspondingly, RED exhibits more severe and more frequent fluctuations, respectively. The IC basically maintains a stable queue size around the reference level in both cases, except that occasional spikes due to transitions become larger in FIG. 7A. This is expected, since more abrupt "jumps" in WPER require the IC to undergo greater changes in the equilibrium packet dropping rate.

FIGS. 8A-8C exhibit the queue dynamics with "fatter" pipes, i.e., a bottleneck link with larger propagation delay or higher bandwidth. FIG. 8A increases the propagation delay to 200 ms, approximately the two-way propagation delay with a geostationary satellite, and maintains the total number of flows to be 100. See, M. Allman, D. Glover, and L. Sanchez. "Enhancing TCP over Satellite Channels using Standard Mechanisms. *IETF RFC* 2488, January 1999. We observe that the queue length dynamics tend to fluctuate very severely for both the IC and RED. In fact, the link is not backlogged for a significant portion of the time.

The congestion window of a TCP flow regulates the number of packets in transit. It grows larger with a fatter pipe, since more packets in transit are needed to keep the pipe full. When a wireless packet loss occurs, the corresponding flow will spuriously halve its window. With a fatter pipe, the window reduction becomes larger. There are more severe fluctuations on the number of packets in transit, thereby possibly falling below the size of the pipe (≈2cτ) and leaving the link without backlog. When a link is not backlogged, it is outside the operational region of the wireless AQM enhancements.

To mitigate the effect of fatter pipes, the number of TCP flows can be increased so that the congestion window of a single flow becomes smaller. FIG. 8B plots the queue dynamics when the total number of flows is increased to 200. In this case, the link is backlogged throughout the simulation, and the IC can effectively maintain a stable queue size.

Similarly, FIG. 8C plots the queue dynamics when 200 flows are sharing a bottleneck link of doubled bandwidth. In this case, the IC still demonstrates a robust tracking of the reference queue size. The backlog fluctuation with RED is not very significant due to the reduction in maxThresh, where maxThresh is the maximum queue size allowed by RED. However, such reduction is generally not recommended in other scenarios due to the stability requirement of RED.

FIGS. 9A-9C exhibit the queue dynamics with the presence of other traffic. FIG. 9A plots the queue dynamics when HTTP traffic is introduced into the dumbbell topology. In doing so, 120 web client nodes are attached to R1 and ten web server nodes are attached to R2. In this situation the traces of the queue size are more "noisy," since the introduction of the HTTP traffic leads to a greater fluctuation in the network load. Nevertheless, the IC demonstrates an effective and robust tracking of the reference queue level against the disruptions from both perturbing traffic and wireless losses.

FIG. 9B plots the queue dynamics when CBR traffic is introduced into the dumbbell topology. In doing so, 30 user datagram protocol (UDP) sources are attached to R1 and their corresponding destinations to R2. Each UDP flow is driven by a long-lived CBR source at the constant rate of 0.1 Mbps. The UDP flows represent unresponsive flows that do not back off upon network congestion. With RED, the backlog generally shifts up due to the increased long-lived traffic load. On the other hand, the IC still maintains a robust tracking of the reference queue level, despite the presence of unresponsive flows.

FIG. 9C plots the queue dynamics when both HTTP traffic and CBR traffic are present. With RED, the backlog trace becomes more "noisy" and shifts up as well. With the IC, the backlog becomes more "noisy" but still tracks the reference level.

Figure 10:
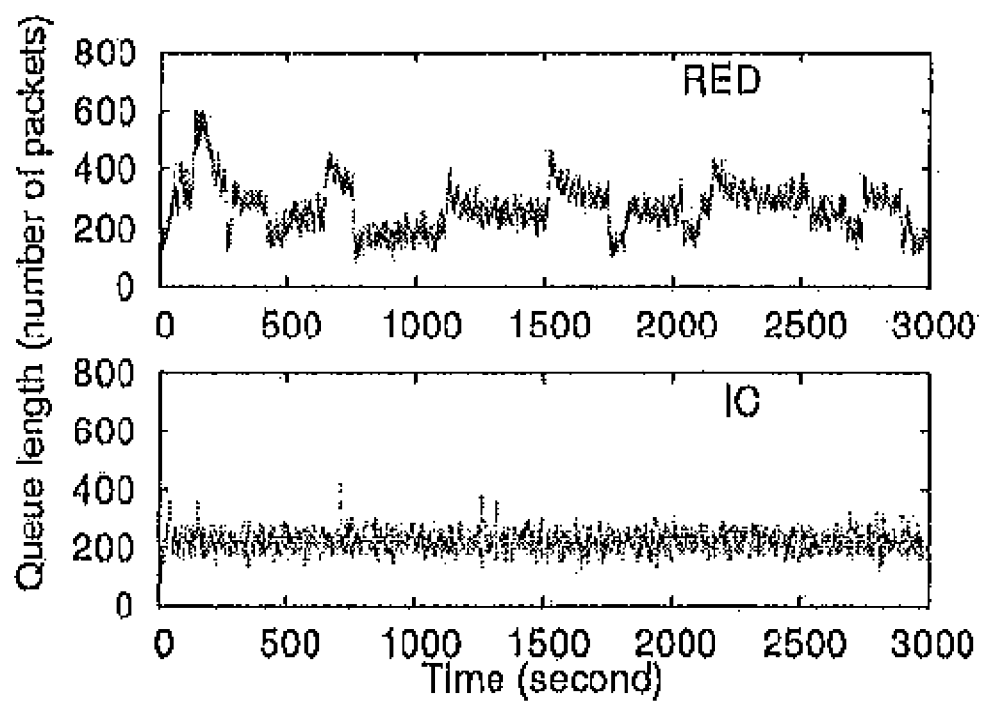
FIG. 10 shows graphs comparing queue length dynamics of Link 1 in a topology with two wireless bottleneck links between RED and the present invention.

In the topology illustrated in FIG. 5, the network configuration follows those in Example 2. The size of the two link buffers are both 600 packets. For both links, minThresh and maxThresh of RED are set to 150 and 500 packets, respectively. $G_I$ is set to $7*10^{-6}$ and $9.5*10^{-6}$ for Links 1 and 2, respectively. Time-varying losses are introduced into both links, with an average loss period of 100 seconds and a maximum WPER of 3%. The simulation results are plotted in FIG. 10. Again, severe fluctuations can be observed in the queue sizes with RED over Link 1. On the other hand, the IC is successful in maintaining stable queue sizes throughout the simulation. Similar results are achieved for Link 2.

These tests demonstrate that RED, one of the most representative AQMs, fails to maintain a stable queue size against time-varying wireless losses. However, an integral controller IC with AQM that forces the queue size to track a reference queue level produces a small, stable backlog at an internet router, despite the presence of wireless losses. This is achieved by using the frequency domain representation of TCP/AQM and applying the Internal Model principle to reject the disturbances of wireless losses, thereby attaining such robust tracking. The integral controller (IC) is devised as an embodiment of the Internal Model principle, and is developed with a set of design rules.

A series of experiments examined the performance of the IC and compared it with RED. In particular, the impact of severe variations of wireless losses, fat pipes, and the HTTP traffic were evaluated with respect to the two AQM algorithms (RED and IC). In general, the IC demonstrated very robust performance in maintaining a small, stable backlog under wireless losses.

As indicated above, the AQM sets the aggregate transmission rate based on the packet drop rate. When the drop rate is high, the system assumes there is congestion, so the transmission rate is slowed. However, when the wireless portion of the network has packet losses due to interference or propagation loss, this can be misinterpreted as congestion, which causes the AQM to slow the transmission, which in term causes a backlog in the queue. Such a backlog has a negative effect on system performance, i.e., it can cause end-to-end delay; it loses the ability to absorb data bursts and can even cause actual congestion.

To correct for this the actual backlog is measured and compared to a standard. Based on this, the packet drop rate that the AQM depends on is modified so the transmission rate is not reduced due to wireless losses unrelated to congestion. One example of an embodiment of an AQM design that includes the integral controller of the present invention is illustrated in FIG. 11.

The IC in this embodiment is implemented in parallel with other conventional AQM components labeled as other AQM components 110 that output a conventional packet dropping rate Pi for use in setting the transmission rate. When there are no other parallel components, the output of circuit 110 is directly wired to Pl[k−1].

Figure 11:
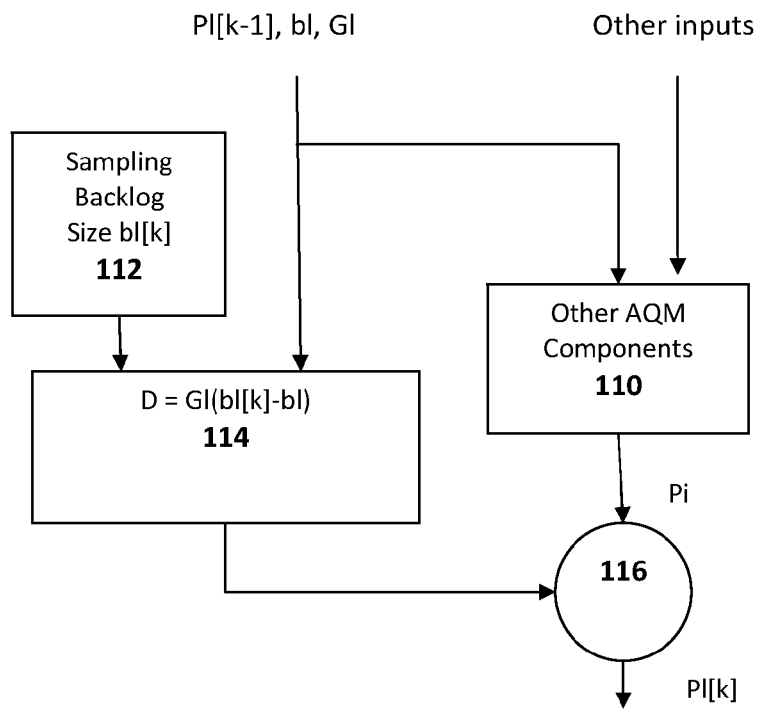
FIG. 11 is a block diagram of an embodiment of an AQM design with an integral controller according to the present invention.

The integrated controller (IC) of FIG. 11 includes a sampling circuit 112 which samples the queue backlog size as bl[k]. This value is then compared with a reference queue size bl in comparator 114. An increment D is computed in comparator 114 as Gl(bl[k]−bl). The amount D is positive if the instantaneous queue size exceeds the reference queue level and it is negative otherwise. The increment D is then added to Pi in summing circuit 116. The resulting sum will be the new packet dropping rate Pl[k].

Thus, the new rate has been compensated for wireless loses that do not reflect congestion. If the actual backlog is below a reference level, the drop rate is reduced to that which it would have in prior art systems and the transmission rate is not unnecessarily slowed. As a result, the backlog is kept at a favorably low rate where possible.

Apart from the stabilized queue lengths, deployment cost of the current invention is relatively small as it can be implemented either in the software or the hardware of a router. In particular it can be implemented in the intermediate routers by upgrading the software. When the computation demand is stringent, such as in the case of core routers, its logic can be realized in hardware, e.g., as integrated circuits. Moreover, implementation is local within a router and the communication protocol is not changed. It does not require other communicating parties to modify their equipment in order to benefit from the new mechanism.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that the claimed subject matter not be limited to the particular examples disclosed, but that such claimed subject matter may also include all implementations falling within the scope of the appended claims, and equivalents thereof.

Any reference in this specification to "one embodiment," "an embodiment," "exemplary embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method of maintaining a small, stable backlog at an intermediate router buffer in a network that includes internal wireless segments when wireless loss occurs, comprising the steps of:

utilizing active queue management (AQM) algorithms at the internal router for controlling the intermediate router; said algorithms being based on an Internal Model Principle from control theory; and wherein packet dropping probabilities are determined based on instantaneous queue size, which indicates the backlog at the intermediate router buffer, via a compensator function that incorporates a model of wireless losses so as to distinguish between wireless losses and congestion, said compensator function includes an integral controller as one of its elements; and wherein said integral controller incorporated with AQM algorithms at the internal router forces the queue size to track a reference queue level based primarily on congestion by performing the steps of:

comparing the instantaneous queue size with a reference queue level;

adding to the packet dropping probability by an amount proportional to a difference between the instantaneous queue size and the reference queue level, and wherein the said amount is positive if the instantaneous queue size exceeds the reference queue level and is negative if it is not.

2. A method of tracking the backlog at an intermediate router buffer to a tunable reference queue level in a network that includes internal wireless segments that have wireless losses, comprising the steps of:

providing active queue management (AQM) algorithms at the intermediate router for controlling the intermediate router, said algorithms being based on an Internal Model principle from control theory; and wherein packet dropping probabilities of AQM algorithms are determined at the intermediate router based on instantaneous queue size via a compensator function that incorporates a model of wireless losses so as to distinguish between wireless losses and congestion, and treats wireless loses as disturbances that are rejected in determining the packet dropping probabilities, said compensator function includes an integral controller as one of its elements and wherein said integral controller performs the steps of:

comparing the instantaneous queue size with the reference queue level, adding to the packet dropping probability by an amount proportional to a difference between instantaneous queue size and the reference queue level, and wherein said amount is positive if instantaneous queue size exceeds the reference queue level, and is negative otherwise.

3. The methods of claim 1, wherein said model of wireless losses is a step input function.

4. The methods of claim 2, wherein said model of wireless losses is a step input function.

5. Apparatus for maintaining a small, stable backlog at an intermediate router buffer in a network that includes internal wireless segments when wireless loss occurs, comprising:

an active queue management (AQM) system at the intermediate router for controlling the router at a sending end of a Link 1 based on a reference queue size bl, a prior packet dropping rate Pl[k−1] and a backlog sampling frequency Gi, the AQM system including a compensator function that incorporates a model of wireless losses so as to distinguish between wireless losses and congestion, and an integral controller that forces the queue size to track a reference queue level based primarily on congestion;

a sampling circuit that samples a queue backlog size, bl[k] at a sampling frequency;

a comparator which compares the sampled queue backlog size (bl[k]) with a reference queue size (bl) to determine a difference increment D=Gl(bl[k]−bl) at the sampling frequency, D is positive if the instantaneous queue size exceeds a reference queue level and is negative otherwise; and an adder by which the increment D is added to a current packet dropping rate Pi by the AQM system to form a new packet dropping rate Pl[k].

\* \* \* \* \*